United States Patent [19]

Whitehouse

[11] 3,786,873
[45] Jan. 22, 1974

[54] STALL TORQUE REGULATOR VALVE FOR FLUID OPERATED POWER TOOL

[75] Inventor: Hugh L. Whitehouse, Lyndhurst, Ohio

[73] Assignee: The Stanley Works, New Britain, Conn.

[22] Filed: Apr. 3, 1972

[21] Appl. No.: 240,715

[52] U.S. Cl. .................................... 173/12, 91/59
[51] Int. Cl. ........................................ B25b 23/14
[58] Field of Search ........................... 173/12; 91/59

[56] References Cited
UNITED STATES PATENTS
3,373,824  3/1968  Whitehouse .......................... 173/12

Primary Examiner—Ernest R. Purser
Attorney, Agent, or Firm—John M. Prutzman et al.

[57] ABSTRACT

A fluid operated stall type power tool having a fluid supply line including a motor inlet passage, the tool incorporating a normally open stall torque regulator valve in the motor inlet passage, a built-in orifice restriction in the supply line upstream of the stall torque regulator and a modulating spring engaging the valve for maintaining valve travel rate of displacement from its normally open position proportional to the rate of increase in the torque load on the motor during loading of the tool.

7 Claims, 3 Drawing Figures

PATENTED JAN 22 1974  3,786,873
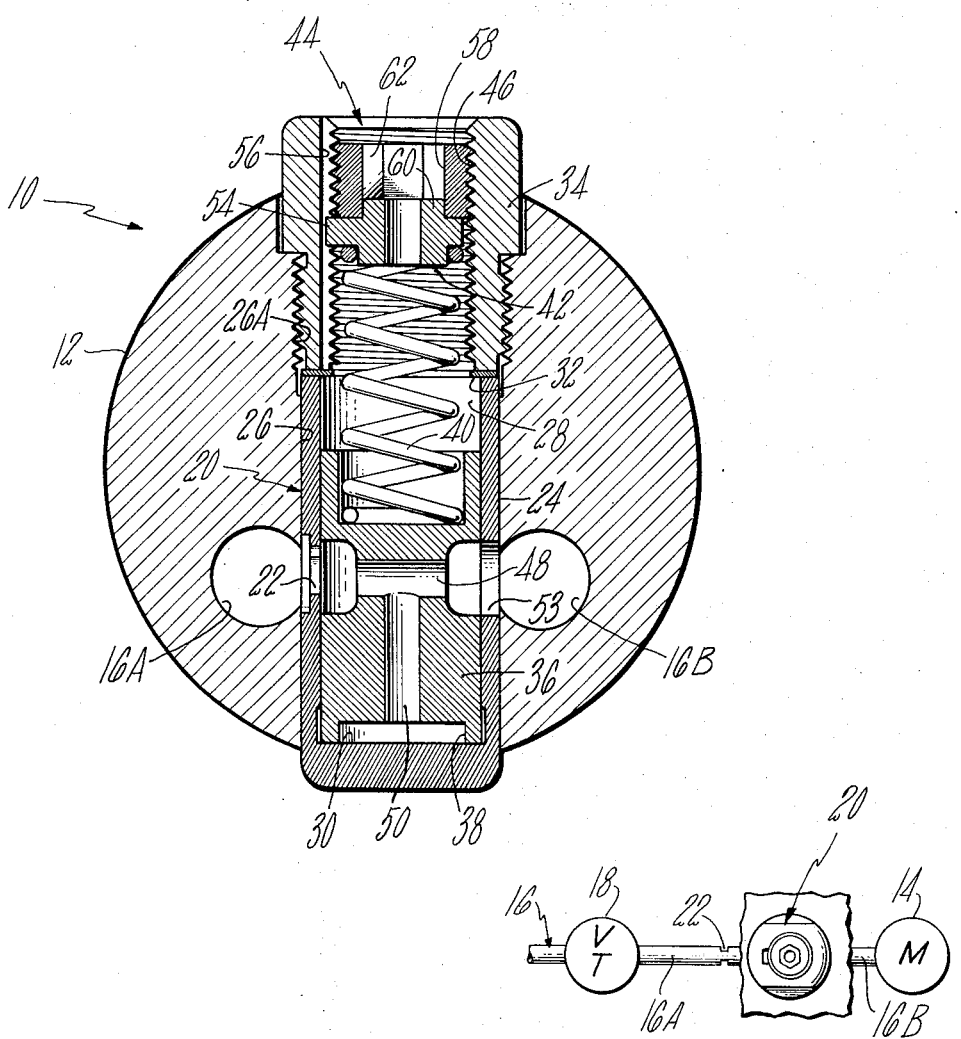
FIG. 1
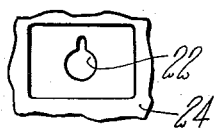
FIG. 2
FIG. 3

STALL TORQUE REGULATOR VALVE FOR FLUID OPERATED POWER TOOL

This invention generally relates to power tools and particularly concerns controls for limiting the stall point of a fluid operated stall type power tool.

A principal object of this invention is to provide a new and improved power tool having a stall torque regulator located in the tool at the motor inlet for controlling the maximum operating pressure of a fluid operated power tool such as a screwdriver, nutsetter and similar stall type power tools having an air operated motor, e.g., and which accordingly controls stall torque of the motor while at the same time minimizing speed reduction at reduced stall points of the tool.

Another object of this invention is to provide a new and improved stall torque regulator of the type described which may be used in either new or existing fluid operated power tools.

A further object of this invention is to provide such a stall torque regulator which is quick and easy to manufacture and assemble and which is of compact rugged construction for reliable performance under demanding conditions with minimum maintenance requirements.

Other objects will be in part obvious and in part pointed out in more detail hereinafter.

A better understanding of the objects, advantages, features, properties and relationships of this invention will be obtained from the following detailed description and accompanying drawing which sets forth an illustrative embodiment and is indicative of the way in which the principle of this invention is employed.

In the drawing:

FIG. 1 is a section view, partly broken away, of a power tool incorporating this invention;

FIG. 2 is a fragmentary view, partly broken away, showing a port formed in a valve chamber member of the tool of FIG. 1; and FIG. 3 is a schematic view showing a stall torque regulator of this invention interposed in a fluid supply line between a fluid operated motor and an on-off control valve.

Referring to the drawing in detail, a power tool such as a power screwdriver, nutsetter or similar fluid operated tool is shown in cross section at 10 in FIG. 1 having a generally cylindrical housing 12 with a fluid motor 14. Motor 14 is preferably a conventional rotary vane type air motor of a general type described in my U.S. Pat. No. 3,373,824 entitled Fluid Operated Tool, issued Mar. 19, 1968 and assigned to the assignee of this invention. Motor 14 is mounted in the housing 12 for driving a spindle, not shown, which will be understood to be operatively connected to a work engaging element of the tool. Compressed air from a suitable source, not shown, is fed to a supply line 16 formed within the housing 12 for driving the air motor 14, and air flow is controlled by any suitable on-off control such as a throttle valve 18.

To regulate the torque output of the tool 10 for running a fastener within a desired torque range, for example, a restriction is provided between motor inlet passage portions 16A and 16B of the supply line 16 to effect a pressure drop at free running speed of the tool 10, whereby reduction in its torque output is achieved without any further reduction in speed in accordance with this invention by providing a built-in stall torque regulator 20 in the inlet passage 16A, 16B leading to the motor 14 with the regulator 20 located downstream of the restriction. If an on-off control, such as valve 18, is part of the tool, the on-off control itself may provide an orifice restriction. The key is that orifice restriction occurs upstream of the stall regulator. In the illustrated embodiment, the restriction is provided by an orifice 22 in communication with motor inlet passage 16A and formed in a valve sleeve 24. Valve sleeve 24 is received in a bore 26 extending across housing 12 to define a valve chamber 28 having a closed end provided by a wall 30 at one end of the sleeve 24 which is shown having an opposite open end in abutting engagement with a washer 32 secured between the open end of the sleeve 24 and a coaxially aligned hollow plug 34 screwed into a threaded portion 26A of the bore 26. The sleeve 24 will be understood to be fixed in bore 26 by any suitable conventional technique.

The stall torque regulator 20 includes a stall torque regulator valve 36 shown for illustrative purposes as being a spool valve received in chamber 28 for reciprocating movement toward and away from its illustrated normally open flow control position established by an annular projection 38 of the valve 36 seating against wall 30 at the closed end of the sleeve 24. Valve 36 is urged toward its normally open position by a pressure balancing spring 40 seated between valve 36 and an adjustment plate 42 of a lock mechanism 44 operatively mounted in an internally threaded opening 46 of plug 34.

The stall torque regulator valve 36 is designed to vary the volume of air flow through the inlet passage 16A, 16B to the motor 14, and thus the motor operating pressure, in proportion to a load on the motor 14. In the specifically illustrated embodiment, valve 36 is shown having a passage 48 extending diametrically through a reduced intermediate portion of the valve 36. Another passage 50 intersects passage 48 in a T shaped arrangement to extend axially through valve 36 to an opening adjacent wall 30 of the sleeve 24. Accordingly, motor operating pressure is directed from the motor 14 and its inlet passage portion 16B through passages 48, 50 to the lower end of the valve 36 as viewed in FIG. 1 for urging valve 36 to move away from its illustrated open position in opposition to the force of balancing spring 40.

As the back pressure from the motor 14 increases responsive to an increasing torque load on tool 10, valve 36 shifts away from its open position across the restricted inlet port or orifice 22 in opposition to the force of the balancing spring 40 to gradually close off the inlet passage 16A, 16B to the motor 14 in supply line 16. Spring 40 serves to continually balance the motor pressure and the orifice 22 preferably is designed to effect a continuously reduced flow in the supply line 16 under increased torque loading to cause motor 14 to stall before valve 36 completely closes off orifice 22 to shut-off the supply line 16, it being understood that the speed characteristics of tool 10 vary inversely with its load characteristics. Orifice 22 serves to maintain valve travel rate proportional to tool loading rate and is shown for this purpose as having a keyhole configuration best seen in FIG. 2 in the specifically illustrated embodiment to provide a graduated flow orifice restriction which is of reduced size and flow capacity relative to the motor inlet passage portions 16A, 16B and outlet port 53 of valve chamber 28.

Running free, the motor operating pressure is lower than full line supply pressure, and increases toward line pressure as motor 14 is loaded. At stall, motor stall leakage maintains the motor pressure lower than line pressure. Without such stall leakage, a flow restriction in the line 16 such as orifice 22 would have no effect on stall torque. In an air tool of quality design and manufacture, motor stall pressure is usually within a pound or two of line pressure. But, in the same motor, the motor running pressure, say, with a 90 psi full line supply pressure, may be as low as 65–70 psi. This is caused by the normal restrictions in an on-off valve and associated passageways leading to the motor. In the illustrated embodiment, the restricted orifice 22 within supply line 16 of the tool 10 provides a controlled amount of flow restriction to drop the free running pressure at least to this pressure, or if desired, to a lower pressure. With a built-in restriction causing a free running pressure of, say, 60 psi, stall torque regulator 20 may then be set for 60 psi, e.g., and by virtue of the above described construction will have no effect on the free running speed while yet effecting a reduction in the stall torque by about 33 percent in the example given. Further flow restriction at 22, or at any point further upstream of the stall torque regulator, would increase the range of stall torque, but would reduce the free running speed and reduce the maximum available stall torque.

For quick and easy variation of the stall pressure and accordingly the stall torque to meet the characteristics of different applications of the tool 10, the biasing force of the balancing spring 40 may be adjusted to a desired compression setting by the above mentioned lock mechanism 44. Adjustment plate 42 has a radial tang 54 received in an axially extending slot 56 within plug 34 for movement to a selected position axially of plug 34 responsive to a corresponding adjustment of a hollow hex adjusting screw 58. Screw 58 threadably engages the bore of plug 34 and may be adjusted by a suitable hex wrench, not shown, which is simply inserted through screw 58 to disengage hex projection 60 on plate 42 from a corresponding hex opening 62 in screw 58. Upon withdrawing the wrench, hex projection 60 slips back into locking engagement within hex opening 62 of the screw 58 with tang 54 of the plate 42 located within slot 56 of the plug 34 to secure spring 40 in an adjusted setting for establishing the stall point of the tool 10 for a particular application.

Balancing spring 40 accordingly is selectively set by adjustment of the lock mechanism 44 to control stall pressure and stall torque of the motor 14 without affecting the specified free running speed of the motor by virtue of the location of the stall torque regulator 20 downstream of the restricted orifice 22. The stall torque regulator 20, together with the built-in restricted orifice 22 may be readily incorporated in certain existing fluid operated tools to achieve the above described advantages as well as being quickly and easily manufactured and assembled at low cost to provide a compact new tool construction incorporating a minimum number of parts for extended service under demanding conditions.

As will be apparent to persons skilled in the art, various modifications, adaptations and variations of the foregoing specific disclosure can be made without departing from the teachings of the present invention.

I claim:

1. A stall type fluid operated power tool comprising a housing having a fluid supply line including a motor inlet passage and a valve chamber formed in the motor inlet passage, a fluid operated rotary motor in the housing having a normal free running no-load speed at a predetermined line pressure which decreases in speed as torque loading on the motor increases, a stall torque regulator valve movable in the valve chamber of said motor inlet passage toward and away from a normally open flow control position at one end of the valve chamber, flow restriction means in the housing upstream of said stall torque regulator, the flow restriction means being configured and dimensioned to gradually and increasingly reduce the fluid flow through said valve chamber responsive to valve travel under increased tool torque loading for maintaining the valve travel rate of displacement from its open flow control position proportional to the rate of increase in the torque load on the motor, means in the housing including a sole passageway communicating said one end of the valve chamber and the motor inlet passage for directing fluid under motor operating pressure against the stall torque regulator valve for moving it away from said open flow control position, and biasing means in the housing urging the stall torque regulator valve toward said open flow control position for balancing the force of the motor operating pressure acting on the stall torque regulator valve throughout a range of running conditions from said free running speed to stall at a specified torque load on the motor.

2. The power tool of claim 1 wherein the biasing means is adjustable and coacts with said restriction means for controlling the pressure and torque at which the motor will stall without affecting said free running speed of the motor.

3. The power tool of claim 1 wherein the restriction means comprises a restrictive inlet orifice to the valve chamber of a reduced size relative to the motor inlet passage.

4. The power tool of claim 1 wherein the biasing means includes a spring seat and a spring having one end seated against the stall torque regulator valve and an opposite end engaging the spring seat, the spring seat being adjustably mounted in the housing for varying the degree of compression of the spring and selectively presetting the stall torque of the motor.

5. The power tool of claim 1 further including an on-off control valve operatively mounted in the housing for establishing open and closed fluid flow conditions in the fluid supply line, the on-off control valve and the flow restriction means both being located in the fluid supply line upstream of the stall torque regulator valve.

6. The power tool of claim 1 further including a generally cylindrical member fixed to the housing and defining a chamber therein with an inlet port and an outlet port formed in said member and communicating with the motor inlet passage, the inlet port being of reduced size relative to the outlet and constituting said restriction means in the housing, the inlet port being dimensioned and configured to provide a progressively reduced opening responsive to the stall torque regulator valve being moved away from its open flow control position as torque loading on the motor increases.

7. The power tool of claim 1 wherein the flow restriction means in the housing reduces said normal free running no-load speed of the motor to a specified free running speed at said predetermined line pressure, and wherein the biasing means balances the force of the motor operating pressure acting on the stall torque regulator valve throughout a restricted range of running conditions from said specified free running speed to stall.

* * * * *